(12) United States Patent
Owen et al.

(10) Patent No.: US 10,723,383 B2
(45) Date of Patent: Jul. 28, 2020

(54) METHODS AND APPARATUS TO DETERMINE A VEHICLE BACKUP POSITION FOR LAUNCHING OR LOADING A BOAT USING TRAILER HITCH LOAD

(71) Applicant: Ford Global Technologies, LLC, Dearborn, MI (US)

(72) Inventors: Elizabeth G. Owen, Saline, MI (US); Andrew Niedert, New Hudson, MI (US); Kevin Stanton Giaier, Sylvan Lake, MI (US); Peter Simeon Lazarevski, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 106 days.

(21) Appl. No.: 16/150,067

(22) Filed: Oct. 2, 2018

(65) Prior Publication Data

US 2020/0102009 A1    Apr. 2, 2020

(51) Int. Cl.
*B62D 15/02* (2006.01)
*B62D 13/06* (2006.01)
*B60W 30/18* (2012.01)
*B60P 3/10* (2006.01)

(52) U.S. Cl.
CPC .......... *B62D 15/027* (2013.01); *B62D 13/06* (2013.01); *B60P 3/1075* (2013.01); *B60T 2201/10* (2013.01); *B60W 30/18036* (2013.01); *B60W 30/18109* (2013.01)

(58) Field of Classification Search
CPC ... B62D 15/027; B62D 13/06; B60T 2201/10; B60P 3/1075; B60W 30/18109; B60W 30/18036

USPC .......................................................... 701/41
See application file for complete search history.

(56) References Cited

U.S. PATENT DOCUMENTS

| 3,995,251 | A | * | 11/1976 | Jones | ................. | B60P 3/10 |
| | | | | | | 340/431 |
| 4,008,466 | A | | 2/1977 | Smith | | |
| 5,097,250 | A | * | 3/1992 | Hernandez | ............ | B62D 15/02 |
| | | | | | | 180/271 |
| 5,396,857 | A | | 3/1995 | Emery, Jr. | | |
| 7,561,953 | B2 | * | 7/2009 | Yu | .......... | B62D 6/002 |
| | | | | | | 280/400 |
| 7,692,557 | B2 | * | 4/2010 | Medina | ................ | B60Q 9/00 |
| | | | | | | 340/431 |
| 9,290,204 | B2 | * | 3/2016 | Lavoie | ................. | B60W 50/14 |
| 9,511,799 | B2 | | 12/2016 | Lavoie | | |
| 9,540,043 | B2 | | 1/2017 | LaVoie | | |
| 9,809,250 | B2 | | 11/2017 | LaVoie et al. | | |

(Continued)

FOREIGN PATENT DOCUMENTS

DE        10154612        5/2003

*Primary Examiner* — Muhammad Shafi
(74) *Attorney, Agent, or Firm* — Ray Coppiellie; Hanley, Flight & Zimmerman, LLC (57) ABSTRACT

Methods and apparatus are disclosed herein that determine a vehicle backup position for launching and loading a boat using trailer hitch load. An example apparatus includes a data analyzer to determine, based on a trailer hitch load of a vehicle coupled to a trailer, a vehicle backup position for launching the boat at which a boat coupled to the trailer is floating on a body of water and an instruction generator to instruct a braking system of the vehicle to stop the vehicle at the vehicle backup position for launching the boat.

20 Claims, 6 Drawing Sheets

(56) References Cited

U.S. PATENT DOCUMENTS

| | | |
|---|---|---|
| 9,821,808 B1 | 11/2017 | Abbas et al. |
| 9,840,240 B2 * | 12/2017 | Trombley ............ B60W 30/146 |
| 2006/0187008 A1 * | 8/2006 | Yu ............................ B60D 1/58 |
| | | 340/431 |
| 2006/0206253 A1 * | 9/2006 | Yu ........................... B62D 6/002 |
| | | 701/70 |
| 2019/0143769 A1 | 5/2019 | Niedert et al. |
| 2019/0225196 A1 | 7/2019 | Niedert et al. |
| 2019/0315169 A1 | 10/2019 | Rogness et al. |

* cited by examiner

METHODS AND APPARATUS TO DETERMINE A VEHICLE BACKUP POSITION FOR LAUNCHING OR LOADING A BOAT USING TRAILER HITCH LOAD

FIELD OF THE DISCLOSURE

This disclosure relates generally to boat launching and loading and, more particularly, to methods and apparatus to determine a vehicle backup position for launching and loading a boat using trailer hitch load.

BACKGROUND

When a driver of a vehicle desires to launch a boat (e.g., move the boat from a trailer to a body of water) using a boat ramp or other inclined surface, the driver is to stop the vehicle in a position where the boat (e.g., resting on the trailer that is hitched to the vehicle) is floating on the water. Further, the driver must be careful not to back up too far, as this presents a risk of damage to the vehicle. For example, when the vehicle is in water that is too deep, the vehicle can be damaged or lose traction, making it difficult to get the vehicle out of the water. If the driver does not back the boat up far enough, the driver will not be able to get the boat off of the trailer (e.g., because the boat is not floating). This leaves a small window in which to stop the vehicle to launch the boat properly.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts. Although the figures show layers and regions with clean lines and boundaries, some or all of these lines and/or boundaries may be idealized. In reality, the boundaries and/or lines may be unobservable, blended, and/or irregular.

DETAILED DESCRIPTION

When determining a position of a vehicle from which to launch a boat (e.g., from a trailer that the boat is coupled to) into a body of water (e.g., a lake, a river, etc.), a driver of the vehicle finds a location at which the boat is floating on the body of water but where the vehicle has not backed up too far into the body of water. Difficulties arise if an appropriate backup location is not used for launching the boat into the body of water. For example, if the vehicle is not backed up far enough, the boat will not be floating completely in the water, making it difficult or infeasible to move the boat off of the trailer and into the water. On the other hand, if the vehicle is backed up too far, the static water level or waves may rise to a level that could allow water to enter vehicle components, causing internal damage to the components or affecting drivability, emissions, and/or reliability. Further, when the vehicle is backed up too far, the vehicle can lose traction and may be unable to move forward out of the water under its own power. Additionally, a loss of traction can cause a vehicle to slip backwards deeper into the body of water, creating additional hazards to the vehicle, the driver, and/or the environment.

Therefore, apparatus and methods for determining a precise backup position (e.g., a position to which the vehicle has backed up) for the vehicle where the boat is floating on the body of water is desired to avoid the problems associated with not backing up the vehicle far enough and/or with backing the vehicle up too far. The examples disclosed herein determine a precise location for launching and/or loading a boat using a trailer hitch load. As used herein, trailer hitch load is a load at the vehicle hitch where the trailer couples to the vehicle. In some examples, the trailer hitch load includes three force components: a vertical hitch load (e.g., a force on a trailer tongue), a fore and aft load (e.g., a force caused by braking and/or accelerating), and a lateral load (e.g., caused by cornering, trailer sway, etc.).

Previous methods for determining vehicle backup positions for launching a boat have not been able to determine precise vehicle backup positions that prevent the aforementioned problems. As used herein, a vehicle backup position for launching a boat is a position of the vehicle at which a boat on a trailer begins to float on a body of water. In some examples, the vehicle backup position for launching the boat is the highest backup position (e.g., position farthest from the body of water) on a boat ramp at which a complete length of the boat is floating on the body of water. In some known examples, vehicles are equipped with vision-based systems (e.g., backup cameras). These vision-based systems mounted to vehicles cannot see a rear end of the boat (e.g., a stern or transom of the boat) because the view is blocked by the front of the boat (e.g., a bow of the boat), a truck bed door, a rear vehicle door, a truck tailgate, and/or the trailer. Additionally, inclement weather or inadequate lighting can limit the effectiveness of vision-based systems. Further, if the camera is mounted to a movable object (e.g., a trailer box door, a liftgate door, etc.), the camera may be moved (e.g., when the driver opens a liftgate door to view the boat) and will not be capable of aiding the driver. Thus, the vision-based systems are inadequate to present the driver with all of the information needed to stop the vehicle in the correct vehicle backup position for launching a boat. In another known example, devices (e.g., load-sensing devices, buoyancy indicators, etc.) are mounted to the trailer or the boat to detect when the boat is floating. However, such solutions do not work when the driver has multiple trailers or boats because each trailer and/or boat must be equipped with a separate system.

Examples disclosed herein use a trailer hitch load of a vehicle to determine a precise location from which a boat can be launched into a body of water. The examples disclosed herein allow a driver to launch any boat from any trailer, regardless of differences in size or weight (e.g., of the boat and/or the trailer). For example, the trailer hitch load is a value that represents a load measured at the trailer hitch of the vehicle (e.g., a location on the vehicle instead of on the trailer or boat) and, thus, operates in the same manner regardless of the boat being launched or the trailer coupled to the vehicle. On the other hand, known examples that include devices mounted to the boat or the trailer used to determine when the boat is floating are to use a specified trailer or boat (e.g., the trailer or boat to which the devices are mounted) to operate properly. Further, examples disclosed herein determine a backup distance used during a boat launch to facilitate retrieving the boat from the body of water and loading the boat onto the trailer. Using the example methods and apparatus disclosed herein, the driver of the vehicle can determine an accurate vehicle backup position for launching the boat that facilitates an easy and efficient boat launch so that the vehicle does not back up further than necessary, leading to vehicle damage.

Figure 1A:
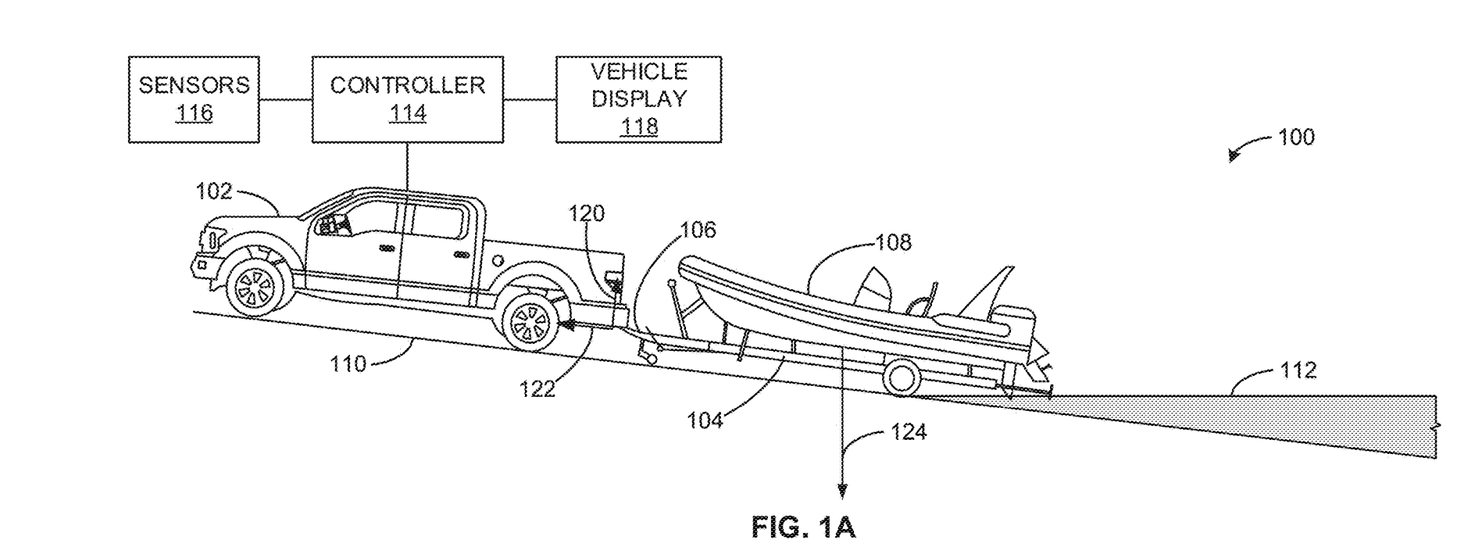
FIGS. 1A and 1B represent example environments in which the apparatus and methods disclosed herein may be implemented.
Figure 1B:
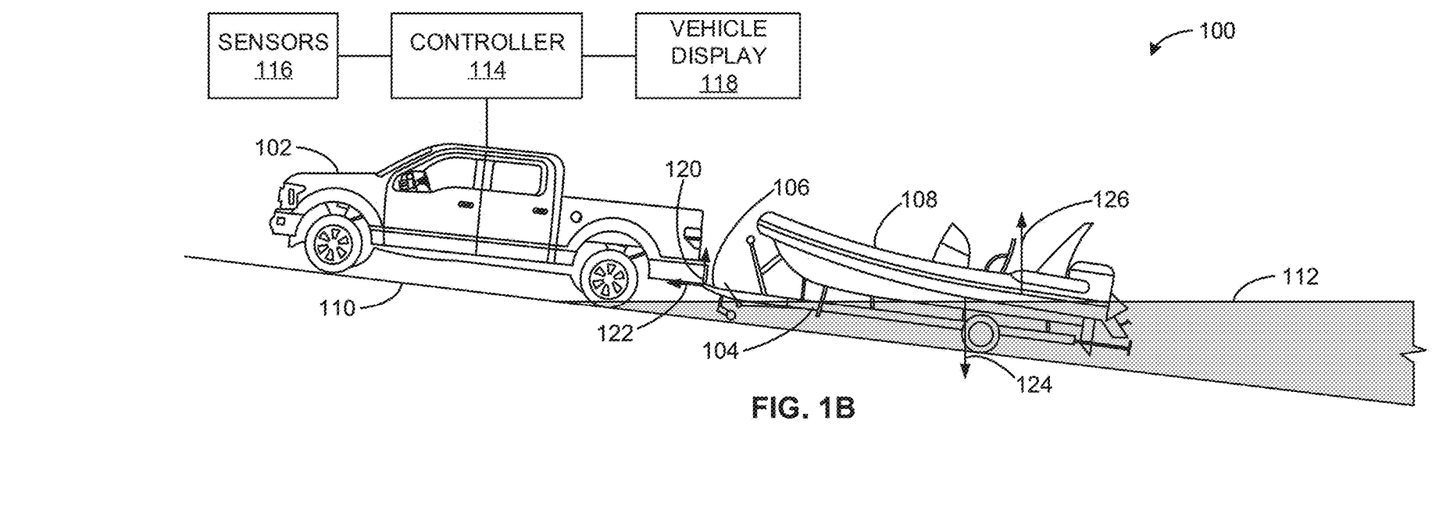

FIGS. 1A and 1B represent an example environment 100 in which the apparatus and methods disclosed herein may be implemented. The example environment 100 includes a vehicle 102 coupled to a trailer 104. In illustrated example, the vehicle 102 is a truck. Additionally or alternatively, the vehicle 102 can be any other vehicle used to haul the trailer 104. The vehicle 102 is coupled to the trailer 104 via an example trailer hitch 106 of the vehicle 102. The trailer hitch 106 enables the vehicle 102 to maneuver the trailer 104. An example boat 108 is mounted to or rests on the trailer 104. The boat 108 can be any type and/or size of boat (e.g., any weight, any design, etc.). In the illustrated example, the vehicle 102 is backing the trailer 104 and the boat 108 down an example boat ramp 110. The example boat ramp 110 can be an inclined surface that leads to an example body of water 112 (e.g., a lake, a river, etc.).

The vehicle 102 of the illustrated example includes a controller 114 communicatively coupled to example sensors 116 and an example vehicle display 118. The example controller 114 uses data from the sensors 116 to determine a vehicle backup position for launching the boat 108 for the vehicle 102. In some examples, the sensors 116 are located at the trailer hitch 106. In some such examples, the sensors 116 measure a trailer hitch load using a change in magnetic field, load cells, hydraulic load cells, strain gauges, and/or any other methods or devices used to measure load (e.g., electronically measure load). Additionally or alternatively, the sensors 116 include wheel speed sensors of the vehicle 102 (e.g., a hall effect sensor).

The vehicle display 118 displays information to a driver of the vehicle 102, such as trailer hitch load and/or backup distance. In some examples, the vehicle display 118 displays alerts and/or messages to the driver indicating a position of the vehicle 102 (e.g., when the boat 108 enters the body of water 112, when the boat 108 is floating, etc.), a change in trailer hitch load, and/or other information associated with launching of the boat 108. In some examples, the driver of the vehicle 102 inputs commands into a user interface of the vehicle display 118 to input information used by the controller 114, acknowledge an alert or message, and/or determine further information to be displayed by the vehicle display 118 (e.g., select information to be displayed from a menu, etc.).

In the illustrated example of FIG. 1A, the trailer 104 and the boat 108 are being backed toward the body of water 112 but have not yet entered the body of water 112. In this example, the load (e.g., force) at the trailer hitch 106 includes a z-component 120 and an x-component 122 due to the incline of the boat ramp 110. In the illustrated example, the z-component 120 and the x-component 122 are oriented relative to an angle of the boat ramp 110 (e.g., instead of a global coordinate system). The z-component 120 and x-component 122 of the trailer hitch load are measured by the sensors 116 and transmitted to the controller 114. The controller 114 uses the z-component 120 and x-component 122 to determine the trailer hitch load (e.g., by determining a resultant load from the z-component 120 and the x-component 122). In some examples, the trailer hitch load further includes a y-component (e.g., if the vehicle 102 is turning with the trailer 104), and the y-component is additionally used to determine the resultant trailer hitch load. In some examples, the trailer hitch load is indicative of the trailer weight 124. The trailer weight 124 includes the weight of the trailer 104 itself and any additional cargo coupled to and/or carried by the trailer 104 (e.g., the boat 108). For example, in FIG. 1A, the trailer weight 124 includes the total weight of the trailer 104 and the weight of the boat 108.

In the illustrated example of FIG. 1B, the vehicle 102 has moved down the boat ramp 110 toward the body of water 112. The trailer 104 and the boat 108 have entered the body of water 112 and are partially submerged (e.g., a rear end of the boat 108 has entered the body of water 112, but a front end of the boat 108 has not). The body of water 112 exerts an example buoyant force 126 on the boat 108. The buoyant force 126 exerts a force in the opposite direction of the trailer weight 124 (e.g., vertically upward in the orientation of FIG. 1B), reducing the trailer weight 124 (e.g., the buoyant force 126 counteracts the weight of the boat 108, effectively reducing the weight of the boat 108 on the trailer 104). The amount the trailer weight 124 is reduced is based on the amount that the boat 108 is submerged in the body of water 112 (e.g., the further the boat 108 is submerged in the body of water 112, the larger the buoyant force 126). As the vehicle 102 continues to move down the boat ramp 110, the buoyant force 126 acting on the boat 108 continues to increase.

The controller 114 monitors the changes in the trailer weight 124 measured at the trailer hitch 106 (e.g., the z-component 120 and the x-component 122 of the hitch load) to determine when the boat 108 is floating. For example, the boat 108 is determined to be floating when the trailer weight 124 is no longer decreasing. When the boat 108 is floating, the trailer weight 124 includes only the weight of the trailer 104 and does not include any weight from the boat 108 (e.g., because the buoyant force 126 is equal to the weight of the boat 108). The weight of the trailer 104 does not change significantly when submerged in the body of water 112. For example, a force created by a strap coupling the boat 108 (e.g., at the bow) to the trailer 104 may act on the trailer 104, but such a force would be inconsequential compared to the weight of the trailer 104. Further, any change in the weight of the trailer 104 (e.g., between the unsubmerged trailer and the submerged trailer) occurs before the boat 108 is floating (e.g., because the trailer 104 is lower and thus submerged sooner), making it possible to determine when the buoyant force 126 is equal to the weight of the boat 108.

When the hitch load stops decreasing and remains generally constant, the controller 114 determines that the vehicle 102 has reached the vehicle backup position for launching the boat 108 and that the boat 108 can be removed from the trailer 104. In some examples, the controller 114 transmits instructions to the vehicle display 118 to display a message or alert to a driver of the vehicle 102. For example, the vehicle display 118 can display a message to the driver indicating the vehicle 102 is to stop moving and/or that the vehicle 102 has reached the vehicle backup position for launching the boat 108. Additionally or alternatively, the vehicle display 118 can alert the driver (e.g., via a flashing screen, a sound, etc.) to stop the vehicle 102. In some examples, the vehicle display 118 includes a user interface that the driver can use to input commands and/or acknowledge the messages and/or alerts. For example, the driver can input a command to receive information showing a distance the vehicle 102 backed up before reaching the vehicle backup position for launching the boat 108 and/or information showing a trailer hitch load after the boat 108 is unloaded (e.g., when the trailer weight 124 equals the weight of the submerged trailer 104).

In some examples, the controller 114 transmits instructions to an engine control module and/or a braking system of the vehicle 102. For example, when the controller 114 determines that the vehicle 102 is at or approaching the vehicle backup position for launching the boat 108 (e.g., the trailer weight 124 is generally constant, a magnitude of the rate of change of the trailer weight 124 is decreasing, etc.), the controller 114 can transmit instructions to the braking system of the vehicle 102 to apply the vehicle brakes, stopping the vehicle 102 at the vehicle backup position for launching the boat 108. In another example, the controller 114 can transmit instructions to the engine control module to apply a vehicle throttle to assist with backing the vehicle 102 down the boat ramp 110 while the trailer weight 124 continues to decrease. In some examples, the controller 114 transmits instructions to the braking system and the engine control module throughout the process of backing up the vehicle 102 to assist in positioning the vehicle 102 in the vehicle backup position for launching the boat 108.

Figure 2:
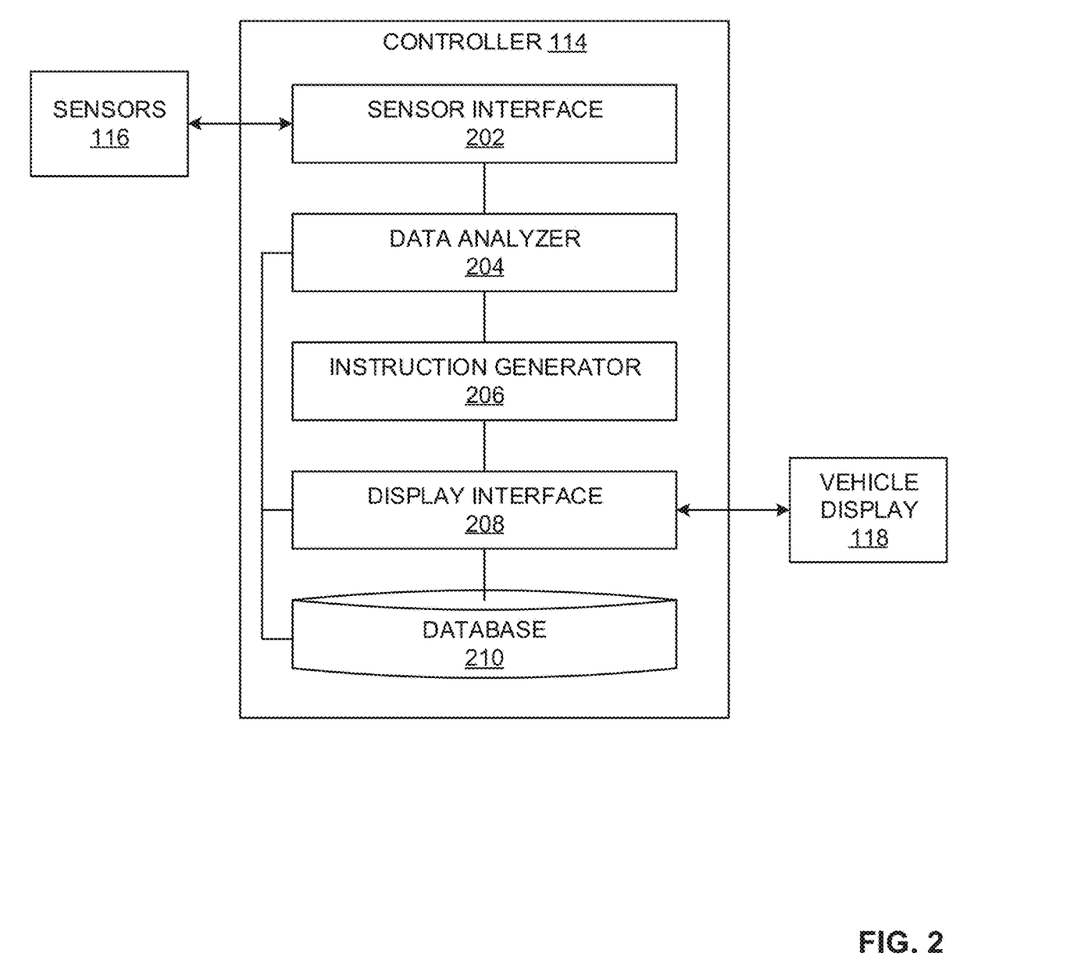
FIG. 2 is a block diagram of the example controller of FIGS. 1A and 1B.

FIG. 2 is a block diagram of the example controller 114 of FIGS. 1A and 1B. The controller 114 of the illustrated example includes an example sensor interface 202, an example data analyzer 204, an example instruction generator 206, an example display interface 208, and an example database 210. In operation, the sensor interface 202 is communicatively coupled to the sensors 116 of FIGS. 1A and 1B. In some examples, the sensor interface 202 receives data from sensors 116 located at a trailer hitch (e.g., the example trailer hitch 106 of FIGS. 1A and 1B). In some such examples, the sensors 116 located at the trailer hitch 106 measure a change in a magnetic field. In some examples, the sensors 116 located at the trailer hitch 106 include load cells, hydraulic load cells, strain gauges, and/or any other load-measuring sensors. Additionally or alternatively, the sensor interface 202 receives data from wheel speed sensors of an anti-lock braking system of the vehicle 102 (e.g., a hall effect sensor). The sensor interface 202 is further communicatively coupled to the data analyzer 204 and transmits the data received from the sensors 116 to the data analyzer 204.

The data analyzer 204 uses the data received from the sensor interface 202 to determine parameters associated with positioning a vehicle (e.g., the vehicle 102 of FIGS. 1A and 1B) in a vehicle backup position for launching a boat (e.g., the boat 108 of FIGS. 1A and 1B). For example, the data analyzer 204 uses data from the sensors 116 to calculate trailer hitch load data (e.g., indicative of the trailer weight 124 of FIGS. 1A and 1B) associated with a trailer (e.g., the trailer 104 of FIGS. 1A and 1B) and/or a boat. An example technique for calculating the trailer hitch load includes utilizing a set of magnetoelastic pins located at the trailer hitch 106 that allows direct measurement of the trailer hitch load based on deformation of the magnetoelastic pins. For example, a magnetic field associated with the magnetized pins changes when the magnetized pins are deformed. The change in the magnetic field can be measured by the sensors 116 (e.g., a magnetic field sensor), and the data analyzer 204 can calculate the trailer hitch load based on the measurement of the change in the magnetic field. In some examples, the data analyzer 204 receives two component magnetic field measurements (e.g., the z-component 120 and the x-component 122 of FIGS. 1A and 1B) and determines the trailer hitch load based on the two components. In some examples, the data analyzer 204 further receives a y-component of the magnetic field. Example methods and apparatus to determine trailer hitch load for a trailer hitch of a vehicle similar to the above method are disclosed in U.S. Patent Application Ser. No. 62/687,061, which is hereby incorporated by reference in its entirety.

In some examples, the data analyzer 204 receives trailer hitch load data from the sensor interface 202 that is measured by sensors 116 at the trailer hitch 106 (e.g., load cells, hydraulic load cells, etc.). For example, load cells incorporated into the trailer hitch 106 can measure trailer tongue loads (e.g., a load exerted on the trailer hitch 106 of the vehicle 102 by the trailer tongue). In some examples, the load cells are oriented with respect to a direction of deflection to measure longitudinal and lateral loads. Additionally or alternatively, load cells can be placed between a body and a frame of the vehicle 102, between the frame and the trailer hitch 106 of the vehicle 102, and/or between the trailer hitch 106 and a receiver tube of the vehicle 102. In some examples, the data analyzer 204 receives data from the sensor interface 202 measured by a strain gauge. In some such examples, the strain gauges are coupled (e.g., adhered) to the trailer hitch 106 and calibrated based on structural characteristics of the trailer hitch 106. The data received by the data analyzer 204 is then used to determine the trailer hitch load based on deflection of the trailer hitch 106 due to the weight of the trailer 104 and/or cargo coupled and/or carried by the trailer 104 (e.g., the boat 108).

The data analyzer 204 further determines a backup distance of the vehicle 102. For example, the data analyzer 204 can receive wheel speed data and use the wheel speed data to calculate a distance traveled by the vehicle 102. In some such examples, the data analyzer 204 calculates the backup distance by taking an integral of the wheel speed multiplied by tire circumference when the vehicle 102 is backing down the boat ramp 110. For example, the data analyzer 204 can calculate the integral of the wheel speed using Simpson's rule, the Trapezoidal rule, and/or other numerical methods of calculating integrals and, further, can multiply the integral by the tire circumference. In some examples, the backup distance is calculated using global positioning system (GPS) coordinates. For example, using GPS coordinates of a starting position (e.g., when the vehicle 102 begins to back up), the data analyzer 204 can determine the distance between the starting position and a current position (e.g., determined by GPS coordinates of a current position). In some examples, a rear-facing camera located at the rear of the vehicle 102 is used to determine backup distance. For example, the rear-facing camera can determine a water line of the body of water 112 as a reference point when the vehicle 102 is backing toward the body of water 112. The data analyzer 204 can use image analysis to identify the water line and display the water line to the driver (e.g., via the vehicle display 118 of FIGS. 1A and 1B). The data analyzer 204 can further determine a backup distance from the water line to the vehicle backup position for launching the boat 108 and, in some examples, can save the backup distance in the database 210 (e.g., for a boat loading process). In some examples, the trailer weight 124 is displayed to the driver of the vehicle 102 as a function of the backup distance of the vehicle 102. An example of the function of trailer weight 124 and backup distance is discussed further in connection with FIG. 4.

In the illustrated example, the data analyzer 204 continuously receives data from the sensor interface 202 as the vehicle 102 is backing toward the vehicle backup position for launching the boat 108. In some examples, the data analyzer 204 and/or, more generally, the controller 114, begin to operate when the driver indicates that the driver is starting to back up the vehicle 102 into the vehicle backup position for launching the boat 108. For example, the display interface 208 is communicatively coupled to the vehicle display 118, which can receive inputs from the driver (e.g., into a user interface). The driver can determine that the controller 114 is to begin operating to assist with a boat launch (e.g., by pressing a button on the user interface) when the driver desires to move the vehicle 102 into the vehicle backup position for launching the boat 108. When such input is received, the data analyzer 204 begins to receive and process the data from the sensor interface 202. In some examples, the data analyzer 204 stores a starting position of the vehicle 102 in the database 210. The starting position can be used, for example, when the driver desires to load the boat 108 back onto the trailer 104.

As the vehicle 102 begins backing the trailer 104 and the boat 108 toward the body of water 112, the data analyzer 204 determines when the boat 108 enters the body of water 112. For example, the data analyzer 204 calculates the trailer hitch load and determines when the trailer hitch load changes from a constant trailer hitch load (e.g., the example buoyant force 126 of FIGS. 1A and 1B is zero, as shown in connection with FIG. 1A) to a decreasing trailer hitch load (e.g., the buoyant force 126 is beginning to counteract the trailer weight 124). The data analyzer 204 determines that the boat 108 has entered the body of water 112 when the trailer hitch load changes (e.g., from a constant value to a decreasing value). The change indicates that the boat 108 has entered the body of water 112 because the buoyant force 126 begins to counteract the trailer weight 124, thus decreasing the trailer hitch load calculated by the data analyzer 204. In some examples, the data analyzer 204 calculates the backup distance and compares the backup distance to the trailer weight 124. In some such examples, the backup distance at which the boat 108 enters the body of water 112 is stored in the database 210.

The data analyzer 204 continues to calculate the trailer hitch load as the boat 108 is submerged further into the body of water 112. When the boat 108 is floating on the body of water 112, the trailer hitch load stops decreasing and becomes generally constant, and the data analyzer 204 determines that the vehicle 102 has reached the vehicle backup position for launching the boat 108. For example, the buoyant force 126 exerted on the boat 108 by the body of water 112 equals the entire weight of the boat 108, and the weight of the trailer 104 (e.g., the submerged trailer 104) is the only weight measured at the trailer hitch 106.

The data analyzer 204 continues to calculate the backup distance and compare the trailer hitch load to the backup distance. The comparison of the trailer hitch load to the backup distance ensures that the vehicle 102 is in the vehicle backup position for launching the boat 108 by preventing the data analyzer 204 from prematurely determining that the vehicle 102 has reached the vehicle backup position for launching the boat 108. For example, if a driver of the vehicle 102 stops the vehicle 102 before the boat is 108 is floating, the backup distance does not change, and the data analyzer 204 determines that the vehicle 102 is to continue backing up before the data analyzer 204 can determine that the vehicle 102 is in the vehicle backup position for launching the boat 108. On the other hand, when the boat 108 is floating, the data analyzer 204 determines that the trailer hitch load is generally constant while backup distance increases, thereby indicating that the vehicle 102 is in the vehicle backup position for launching the boat 108. In some examples, the data analyzer 204 determines the backup distance when the vehicle 102 has reached the backup position for launching the boat 108 and stores the information in the database 210.

The data analyzer 204 is communicatively coupled to the instruction generator 206. The data analyzer 204 outputs the trailer hitch load information and/or the backup distance information to the instruction generator 206. In some examples, the data analyzer 204 continuously outputs the trailer hitch load information to the instruction generator 206. In some alternative examples, the data analyzer 204 outputs the changes in trailer hitch load information (e.g., a change from a constant to a decreasing trailer hitch load, a change from the decreasing to generally constant trailer hitch load, etc.) to the instruction generator 206. In some examples, the instruction generator 206 transmits instructions to systems of the vehicle 102, such as an anti-lock braking system, an engine control module, and/or any other system of the vehicle 102, based on the output from the data analyzer 204.

In some examples, the instruction generator 206 transmits instructions to the engine control module when the driver indicates that the vehicle 102 is to be positioned in the vehicle backup position for launching the boat 108 (e.g., via a user interface of the vehicle display 118). For example, the instruction generator 206 instructs the engine control module to apply a throttle and/or change a throttle position when the vehicle 102 is at the starting position to begin backing up the vehicle 102 down the boat ramp 110. Such instructions cause the vehicle 102 to begin backing down the boat ramp 110 toward the body of water 112. The instruction generator 206 can further continue to adjust the throttle position as the vehicle 102 moves toward the vehicle backup position for launching the boat 108 (e.g., as the trailer hitch load decreases).

In some examples, the instruction generator 206 instructs the anti-lock braking system (ABS) to apply a braking force when the trailer hitch load becomes a generally constant value as a function of backup distance (e.g., a value indicating that the boat 108 is floating on the body of water 112). Such an instruction will cause the vehicle 102 to automatically stop in the vehicle backup position for launching the boat 108. In some examples, the instruction generator 206 can instruct a brake control unit to apply a braking force via a brake-by-wire feature to stop the vehicle at the vehicle backup position for launching the boat 108.

The data analyzer 204 and/or the instruction generator 206 are further communicatively coupled to the display interface 208. As discussed above, the display interface 208 is further communicatively coupled to the vehicle display 118. The display interface 208 facilitates the transfer of information between the controller 114 and the driver of the vehicle 102. In some examples, the data analyzer 204 transmits trailer hitch load information to the display interface 208. The display interface 208 further transmits the trailer hitch load information to the vehicle display 118 where the trailer hitch load information is displayed to the driver of the vehicle 102. In some examples, the trailer hitch load information is displayed to the driver as a graph of trailer hitch load information and backup distance similar to the graph shown in connection with FIG. 4. Additionally or alternatively, the trailer hitch load information is displayed to the driver via other formats (e.g., as an integer) and/or is displayed without the backup distance (e.g., as a bar graph indicating a value of the trailer hitch load). In some examples, the trailer hitch load information is filtered prior to being displayed to the driver on the vehicle display 118. For example, the trailer hitch load can be filtered to remove large, sudden changes in trailer hitch load (e.g., caused by a person getting out of the boat 108 while the boat 108 is attached to the trailer 104). Further, in some examples, the trailer hitch load is filtered using logic inputs, such as, for example, whether the vehicle 102 is moving, whether the vehicle 102 has a majority of a load of the boat 108, etc.

In some examples, the instruction generator 206 transmits instructions to the vehicle display 118 via the display interface 208 to provide instructions to the driver of the vehicle 102 regarding how the driver is to position the vehicle 102 in the vehicle backup position for launching the boat 108. For example, the instruction generator 206 can transmit instructions to continue backing the vehicle 102 down the boat ramp 110 when the trailer hitch load is constant at the starting position (e.g., before the trailer 104 and/or the boat 108 have entered the body of water 112) and/or when the trailer hitch load is decreasing (e.g., the boat 108 is in the body of water 112 but not floating). On the other hand, the instruction generator 206 can transmit instructions to the driver to apply a braking force when the trailer hitch load reaches a generally constant value indicative of the weight of the trailer 104 only (e.g., after the trailer hitch load is generally constant after having decreased from a starting point). The instructions are displayed to the driver of the vehicle 102 to facilitate manual positioning (e.g., the driver applies the throttle and the brakes) of the vehicle 102 in the vehicle backup position for launching the boat 108.

Further, in some examples, the instruction generator 206 is communicatively coupled to a trailer steering assist. For example, the trailer steering assist can include a knob on a dashboard of the vehicle 102 that allows the driver of the vehicle 102 to steer the trailer 104 when backing up the vehicle 102 (e.g., turning the knob turns the trailer 104 in a desired direction). In some examples, the instruction generator 206 transmits instructions to the vehicle display 118 via the display interface 208 to provide instructions to the driver regarding how to steer the trailer 104 (e.g., and the boat 108) using the knob of the trailer steering assist. The driver can therefore use the trailer steering assist in conjunction with the examples disclosed herein to facilitate steering of the vehicle 102 and the trailer 104 to the vehicle backup position for launching the boat 108.

In some examples, the data analyzer 204 receives sensor data from the sensor interface 202 indicative of traction of rear tires (e.g., from a traction control system) of the vehicle 102 (e.g., tires submerged in the body of water 112). In some such examples, the data analyzer 204 displays information indicative of traction of the rear tires to the driver via the vehicle display 118 for the driver to monitor. Such traction information can enable the driver to avoid damage to the vehicle 102 and/or loss of traction (e.g., if the vehicle 102 slips too deep into the body of water 112, losing the ability to move the vehicle 102 out of the body of water, etc.). Additionally or alternatively, the traction information can cause a vehicle 102 having four-wheel drive capabilities to engage a four-wheel drive mode and/or can cause the instruction generator 206 to transmit instructions to the driver of the vehicle 102 to engage four-wheel drive mode.

Further, in some examples, the data analyzer 204 receives data from the sensor interface 202 indicative of whether a rear bumper of the vehicle 102 is submerged (e.g., in the body of water 112). The data analyzer 204 can display information relating to whether the rear bumper of the vehicle 102 is submerged to the driver via the vehicle display 118. For example, an electro-conductive sensor can be mounted to the rear bumper of the vehicle 102 to detect a presence of water. When the electro-conductive sensor indicates that the bumper is submerged in the water (e.g., partially submerged, fully submerged, etc.), the data analyzer 204 can transmit the information to the vehicle display 118. The driver can thus determine to stop the vehicle 102 if this information indicates that the vehicle 102 is in water that is too deep (e.g., the vehicle 102 may be damaged). In some examples, the data analyzer 204 determines that the boat ramp 110 is not steep enough to launch the boat 108 based on the traction information and/or the information indicating the bumper of the vehicle 102 is submerged. For example, if the traction of the rear tires is low enough and/or the rear bumper is submerged, yet the boat 108 is not floating on the body of water 112, the data analyzer 204 determines that the boat ramp 110 is not to be used because of the risk of damage to the vehicle 102.

In some examples, the controller 114 can further be used to load the boat 108 onto the trailer 104 from the body of water 112. For example, the starting position stored in the database 210 can be accessed by the data analyzer 204. In some examples, the starting position is GPS coordinates stored in the database 210 when the controller 114 began the boat launching process. In some examples, the starting position is determined with reference to a water line (e.g., determined by a rear-facing camera and/or the data analyzer 204). The driver of the vehicle 102 can position the vehicle 102 in the starting position and begin the boat loading process based on, for example, the stored GPS coordinates. In some examples, the data analyzer 204 uses the backup distance calculated during the boat launch (e.g., the distance between the vehicle backup position for launching the boat 108 and the starting position) to determine the distance that the vehicle 102 is to travel down the boat ramp 110 from the starting position to reach a vehicle backup position for loading the boat 108. In such examples, the vehicle backup position for launching the boat 108 is also used as the vehicle backup position for loading the boat 108 (e.g., the position of the vehicle 102 from which the boat is to be loaded onto the trailer 104). Additionally or alternatively, the data analyzer 204 can make changes to the vehicle backup position for launching the boat 108 to determine a vehicle backup position for loading the boat 108. For example, the data analyzer 204 can adjust the vehicle backup position for loading the boat 108 to be slightly higher on the boat ramp 110 than the vehicle backup position for launching the boat 108 (e.g., by reducing the backup distance the vehicle 102 is to travel) to facilitate loading of the boat 108 onto the trailer 104.

In some examples, the instruction generator 206 uses the known backup distance from the starting position to instruct the driver of the vehicle 102 and/or systems of the vehicle 102 to position the vehicle 102 in the vehicle backup position for loading the boat 108. For example, the instruction generator 206 can transmit instructions to the vehicle display 118 via the display interface 208 that instruct the driver to continue backing up the vehicle 102 or to apply a braking force to stop the vehicle 102. In some examples, the vehicle display 118 displays a distance from the vehicle backup position for loading the boat 108 to indicate to the driver how much further the driver must travel to reach the vehicle backup position for loading the boat 108. Additionally or alternatively, the instruction generator 206 can transmit instructions to an engine control module to maintain and/or adjust a throttle position to back up the vehicle 102. For example, the instruction generator 206 can instruct the engine control module to maintain vehicle speed (e.g., maintain throttle position), increase vehicle speed (e.g., increase throttle position), or decrease vehicle speed (e.g., decrease throttle position). In some examples, the instruction generator 206 can instruct the ABS to apply a braking force to stop the vehicle 102 at the vehicle backup position for loading the boat 108. Once the vehicle 102 is in the vehicle backup position for loading the boat 108, the boat 108 can be loaded onto the trailer 104 from the body of water 112.

While an example manner of implementing the controller 114 of FIGS. 1A and/or 1B is illustrated in FIG. 2, one or more of the elements, processes and/or devices illustrated in FIG. 2 may be combined, divided, re-arranged, omitted, eliminated and/or implemented in any other way. Further, the example sensor interface 202, the example data analyzer 204, the example instruction generator 206, the example display interface 208, the example database 210, and/or, more generally, the example controller 114 of FIG. 2 may be implemented by hardware, software, firmware and/or any combination of hardware, software and/or firmware. Thus, for example, any of the example sensor interface 202, the example data analyzer 204, the example instruction generator 206, the example display interface 208, the example database 210, and/or, more generally, the example controller 114 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example sensor interface 202, the example data analyzer 204, the example instruction generator 206, the example display interface 208, the example database 210, and/or the example controller 114 is/are hereby expressly defined to include a non-transitory computer readable storage device or storage disk such as a memory, a digital versatile disk (DVD), a compact disk (CD), a Blu-ray disk, etc. including the software and/or firmware. Further still, the example controller 114 of FIG. 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 3:
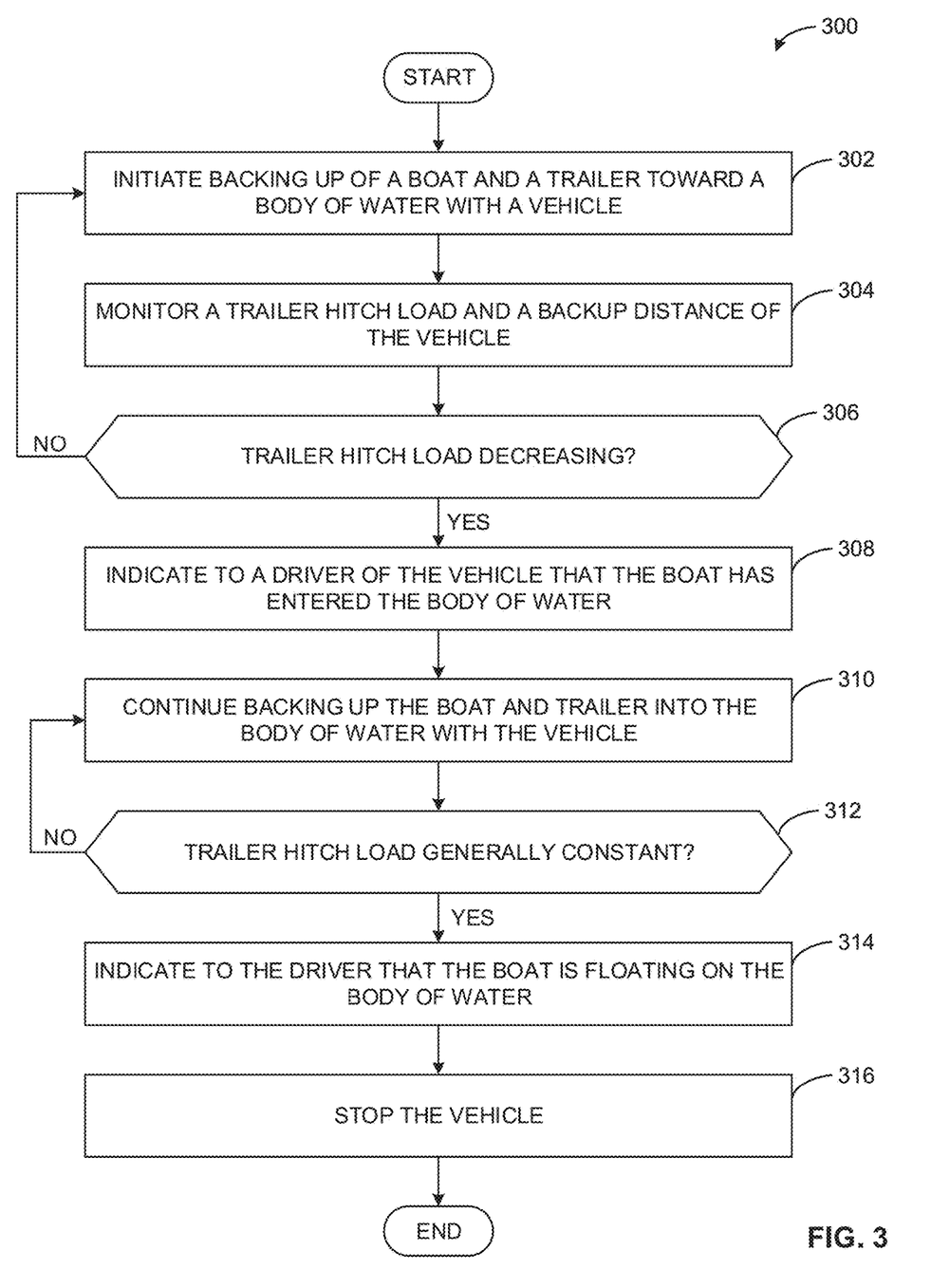
FIG. 3 is a flowchart representative of machine readable instructions that may be executed to implement the example controller of FIGS. 1A, 1B, and/or 2 to position a vehicle in a backup position for launching and/or loading a boat.

Flowcharts representative of example hardware logic, machine readable instructions, hardware implemented state machines, and/or any combination thereof for implementing the controller 114 of FIG. 2 are shown in FIGS. 3 and/or 4. The machine readable instructions may be an executable program or portion of an executable program for execution by a computer processor such as the processor 612 shown in the example processor platform 600 discussed below in connection with FIG. 6. The program may be embodied in software stored on a non-transitory computer readable storage medium such as a CD-ROM, a floppy disk, a hard drive, a DVD, a Blu-ray disk, or a memory associated with the processor 612, but the entire program and/or parts thereof could alternatively be executed by a device other than the processor 612 and/or embodied in firmware or dedicated hardware. Further, although the example program is described with reference to the flowcharts illustrated in FIGS. 3 and/or 4, many other methods of implementing the example controller 114 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

Figure 4:
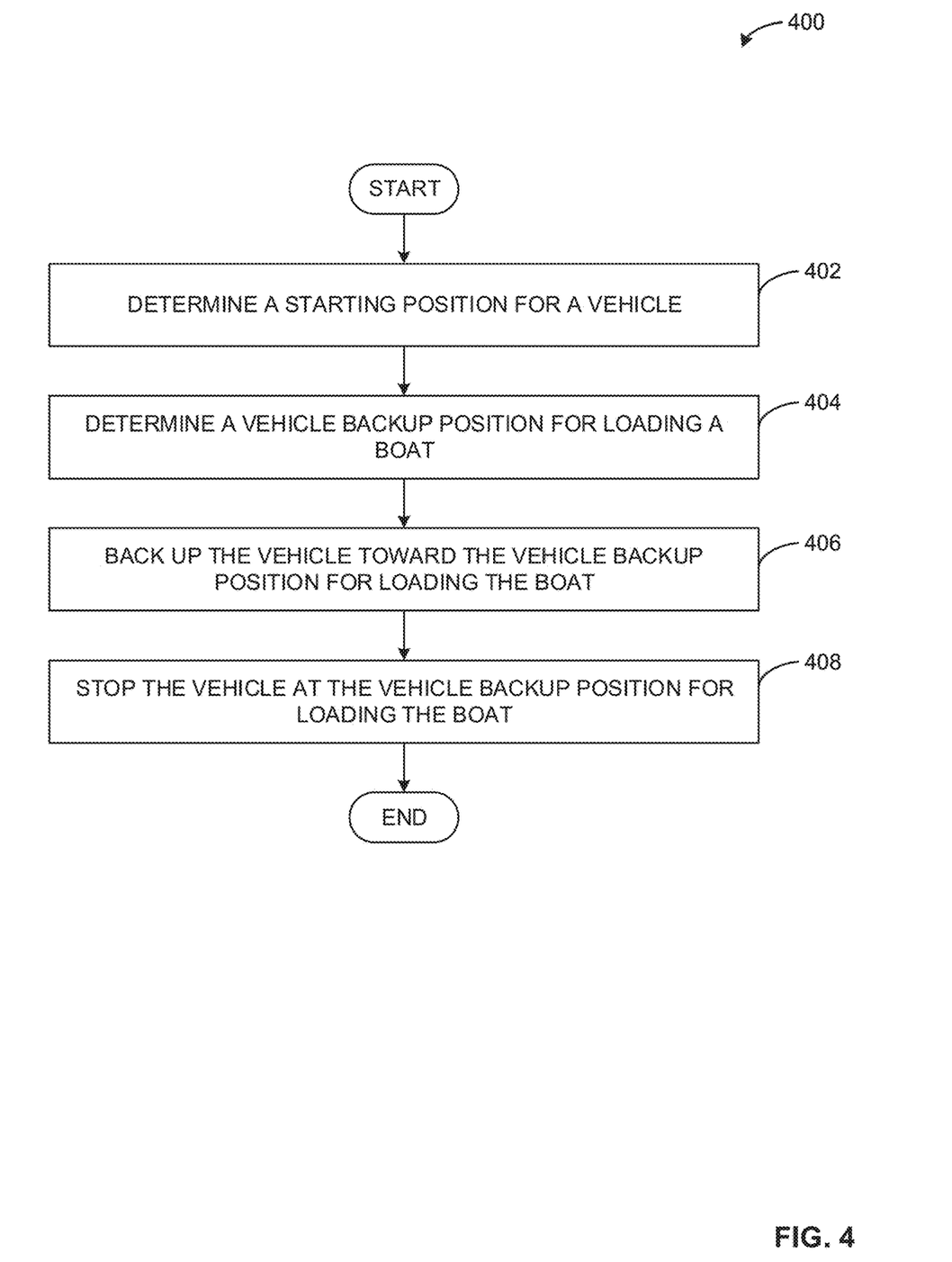
FIG. 4 is a flowchart representative of machine readable instructions that may be executed to implement the example controller of FIGS. 1A, 1B, and/or 2 to position a vehicle in a vehicle backup position for loading a boat.

As mentioned above, the example processes of FIGS. 3 and/or 4 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C.

FIG. 3 is a flowchart representative of machine readable instructions that may be executed to implement the example controller 114 of FIGS. 1A, 1B, and/or 2 to position a vehicle (e.g., the example vehicle 102 of FIGS. 1A and 1B) in a vehicle backup position for launching a boat (e.g., the boat 108 of FIGS. 1A and/or 1B). The example process 300 begins at block 302 where the controller 114 initiates backing up of a boat and a trailer (e.g., the trailer 104 of FIGS. 1A and/or 1B) toward a body of water (e.g., the body of water 112 of FIGS. 1A and/or 1B) with a vehicle 102. For example, the controller 114 can instruct a driver of the vehicle 102 to back the boat 108 and the trailer 104 down a boat ramp (e.g., the boat ramp 110 of FIGS. 1A and/or 1B) toward the body of water 112 (e.g., a lake, a river, etc.).

The controller 114 further monitors a trailer hitch load (e.g., at the example trailer hitch 106 of FIGS. 1A and/or 1B) and the backup distance of the vehicle 102 (block 304). For example, the data analyzer 204 of FIG. 2 can use trailer hitch load data from the sensor interface 202 of FIG. 2 to determine a trailer weight (e.g., the trailer weight 124 of FIGS. 1A and/or 1B). Further, the data analyzer 204 calculates backup distance simultaneously with the trailer hitch load. In some examples, the data analyzer 204 compares the trailer hitch load and the backup distance while backing up the trailer 104 and the boat 108.

At block 306, the controller 114 determines whether the trailer hitch load is decreasing. For example, the data analyzer 204 determines whether the trailer hitch load has a constant value or has begun to decrease as a function of the backup distance, indicating that the boat 108 has entered the body of water 112 (e.g., the buoyant force 126 of FIGS. 1A and/or 1B is being exerted on the boat 108). When the data analyzer 204 determines that the trailer hitch load has begun to decrease, control of process 300 proceeds to block 308. On the other hand, if the data analyzer 204 determines that the trailer hitch load remains constant, control returns to block 302 where the controller 114 causes the vehicle 102 to back up the boat 108 and the trailer 104 toward the body of water 112.

At block 308, the controller 114 indicates to a driver of the vehicle 102 that the boat 108 has entered the body of water 112. For example, the data analyzer 204 transmits the trailer hitch load information to a vehicle display (e.g., the example vehicle display 118 of FIGS. 1A and/or 1B) via a display interface (e.g., the display interface 208 of FIG. 2). In some examples, the display interface 208 indicates to the driver that the boat 108 has entered the body of water 112 (e.g., via text, a sound, a message, etc.) based on the trailer hitch load information transmitted by the data analyzer 204.

The controller 114 further continues backing up the boat 108 and the trailer 104 into the body of water 112 with the vehicle 102 (block 310). For example, the instruction generator 206 can transmit instructions to the driver of the vehicle 102 instructing the driver to continue backing the vehicle 102 down the boat ramp 110. Additionally or alternatively, the instruction generator 206 can transmit instructions to an engine control module instructing the engine control module to maintain or increase a throttle position to continue backing up the vehicle 102.

At block 312, the controller 114 determines whether the trailer hitch load is generally constant. For example, the data analyzer 204 continuously monitors the trailer hitch load to determine when the trailer hitch load becomes a generally constant value. When the trailer hitch load changes from a decreasing value to a generally constant value, the data analyzer 204 determines that the boat 108 is floating on the body of water 112. The generally constant trailer hitch load indicates that the buoyant force 126 equals the weight of the boat 108, and, therefore, the trailer hitch load includes only the weight of the trailer 104. When the trailer hitch load is generally constant, the process 300 proceeds to block 314. If the trailer hitch load is not generally constant (e.g., is still decreasing), the process 300 returns to block 310, where the controller 114 continues backing up the boat 108 and the trailer 104 into the body of water 112 with the vehicle 102.

The controller 114 further indicates to the driver that the boat 108 is floating on the body of water 112 (block 314). For example, the data analyzer 204 can transmit trailer hitch load information to the vehicle display 118 via the display interface 208. In some examples, the trailer hitch load information is displayed to the driver on the vehicle display 118 along with an indication that the boat 108 is floating on the body of water 112 (e.g., via an alert, a sound, etc.).

At block 316, the controller 114 stops the vehicle 102. For example, the instruction generator 206 can transmit instructions to the driver of the vehicle 102 (e.g., via the vehicle display 118) instructing the driver to stop the vehicle 102 (e.g., because the vehicle 102 is in the vehicle backup position for launching the boat 108). Additionally or alternatively, the instruction generator 206 can transmit instructions to an ABS instructing the ABS to apply a braking force to stop the vehicle 102 in the vehicle backup position for launching the boat 108. Further, in some examples, the instruction generator 206 can instruct a brake control unit to apply a braking force via a brake-by-wire feature. When the vehicle 102 has been stopped, the process 300 concludes.

FIG. 4 is a flowchart representative of machine readable instructions that may be executed to implement the example controller 114 of FIGS. 1A, 1B, and/or 2 to position a vehicle (e.g., the vehicle 102 of FIGS. 1A and 1B) in a vehicle backup position for loading a boat (e.g., the boat 108 of FIGS. 1A and 1B). The example process 400 begins at block 402 where the controller 114 determines a starting position for a vehicle. For example, the data analyzer 204 of FIG. 2 can determine a starting position (e.g., a position at which a driver of the vehicle 102 begins backing up the vehicle 102) based on a previous boat launch. In some examples, the data analyzer 204 stores the starting position as a GPS coordinate in the example database 210 of FIG. 2 when the boat 108 is initially launched. The data analyzer 204 can further transmit the starting position (e.g., as a GPS coordinate) to a driver of the vehicle 102 via the vehicle display 118.

The controller 114 further determines a vehicle backup position for loading the boat 108 for the vehicle 102 (block 404). For example, the data analyzer 204 can further store a vehicle backup position for launching the boat 108 (e.g., as GPS coordinates) from a previous boat launch and use this position as the vehicle backup position for loading the boat 108. In some examples, the data analyzer 204 can modify the vehicle backup position for launching the boat 108 to get the vehicle backup position for loading the boat 108. For example, the data analyzer 204 can reduce a backup distance (e.g., between the starting position and the vehicle backup position for launching the boat 108) gathered during the boat launch to determine the vehicle backup position for loading the boat 108. When the vehicle backup position for loading the boat 108 for the vehicle 102 is determined, the data analyzer 204 can further determine the backup distance that the vehicle 102 is to travel between the starting position and the vehicle backup position for loading the boat 108. In some examples, the data analyzer 204 transmits the backup distance information to the driver via the example vehicle display 118 of FIGS. 1A and 1B.

At block 406, the controller 114 backs up the vehicle 102 toward the vehicle backup position for loading the boat 108. For example, the instruction generator 206 can transmit instructions to the driver of the vehicle 102 instructing the driver to back up the vehicle 102 to the vehicle backup position for loading the boat 108. In some examples, the instructions are displayed to the driver on the vehicle display 118. Additionally or alternatively, the instruction generator 206 can instruct an engine control module to increase or maintain a throttle position to move the vehicle 102 down the example boat ramp 110 of FIGS. 1A and 1B.

At block 408, the controller 114 stops the vehicle 102 at the vehicle backup position for loading the boat 108. For example, the instruction generator 206 can transmit instructions to the driver of the vehicle 102 instructing the driver to stop the vehicle 102 when the vehicle 102 reaches the vehicle backup position for loading the boat 108. In some examples, the instructions are displayed to the driver on the vehicle display 118. Additionally or alternatively, the instruction generator 206 can instruct an anti-lock braking system to apply a braking force to stop the vehicle 102 as it reaches the vehicle backup position for loading the boat 108. When the vehicle 102 is positioned in the vehicle backup position for loading the boat 108, the boat 108 can be loaded onto a trailer (e.g., the trailer 104 of FIGS. 1A and 1B).

Figure 5:
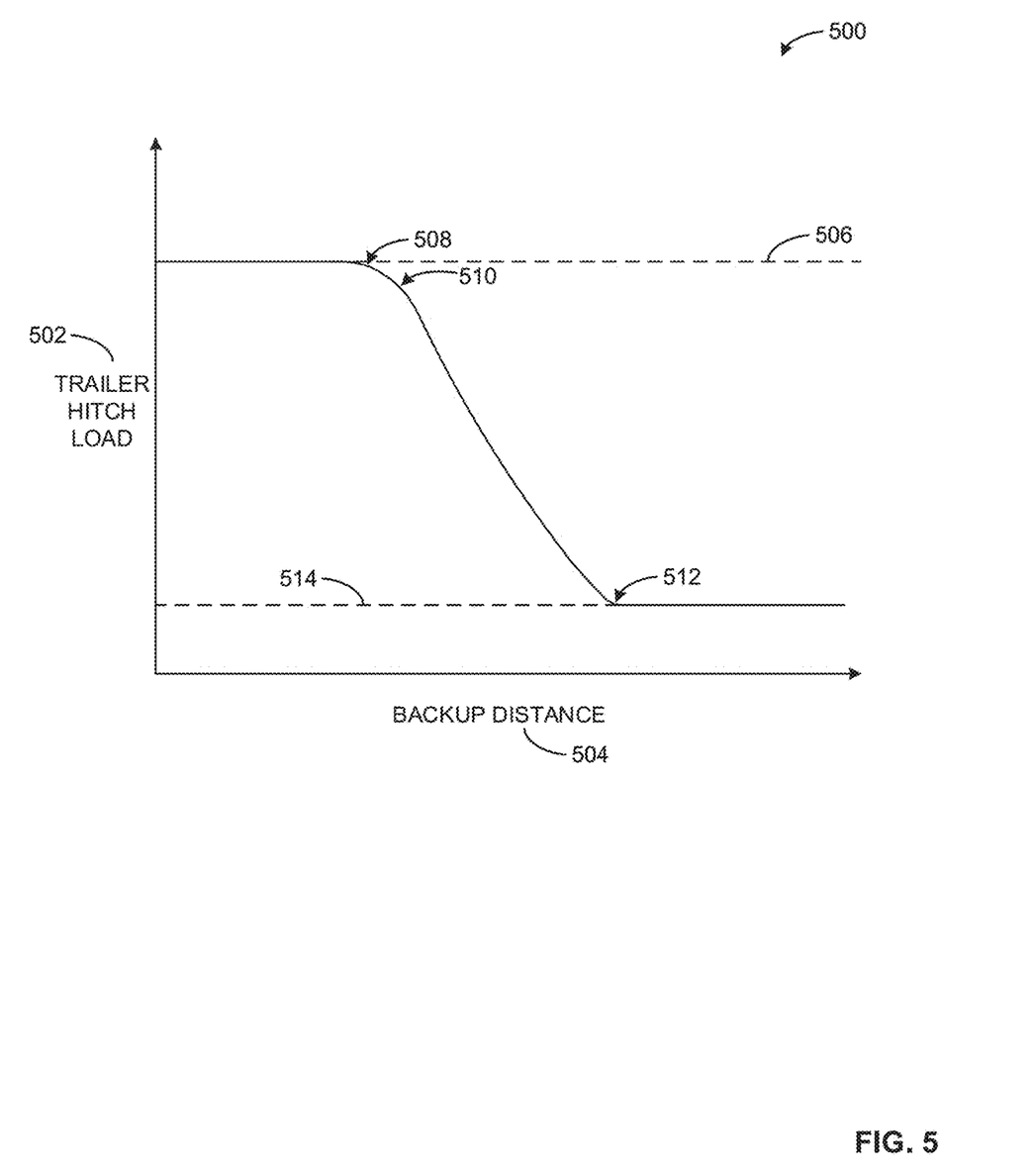
FIG. 5 is a graph representative of output from the example controller of FIGS. 1A, 1B, and/or 2 during a boat launch.

FIG. 5 is a graph 500 representative of output from the example controller 114 of FIGS. 1A, 1B, and/or 2 during a boat launch. The example graph 500 includes trailer hitch load 502 as a function of backup distance 504 (e.g., a distance the vehicle 102 of FIGS. 1A and/or 1B has backed up during a boat launch). In some examples, the trailer hitch load 502 is calculated by the data analyzer 204 of FIG. 2 using data collected by example sensors 116 of FIGS. 1A and 1B. For example, the trailer hitch load is calculated by combining the example z-component 120 and the example x-component 122 of FIGS. 1A and 1B. Additionally or alternatively, the trailer hitch load can be calculated using a single component (e.g., only the z-component 120 or only the x-component 122). In some examples, the backup distance 504 is calculated by the data analyzer 204 using wheel speed data from the sensors 116. For example, the data analyzer 204 can calculate the backup distance 504 by taking the integral of the wheel speed data and multiplying the integral of the wheel speed data by the circumference of tires of the vehicle 102. In some examples, a method of numerical integration is used to calculate the integral of the wheel speed data (e.g., Simpson's rule, Trapezoidal rule, etc.). The data analyzer 204 can compare the trailer hitch load 502 to the backup distance 504 of the vehicle 102.

In the example graph 500, the trailer hitch load 502 starts at an initial trailer weight 506. The initial trailer weight 506 includes the weight of a trailer (e.g., the trailer 104 of FIGS. 1A and/or 1B) and the weight of a boat (e.g., the boat 108 of FIGS. 1A and/or 1B) coupled to the trailer 104. For example, as the vehicle 102 begins to back the trailer 104 and the boat 108 down a boat ramp (e.g., the boat ramp 110 of FIGS. 1A and/or 1B), neither the trailer 104 nor the boat 108 are submerged in a body of water (e.g., the body of water 112 of FIGS. 1A and/or 1B). Accordingly, no buoyant force (e.g., the buoyant force 126 of FIGS. 1A and/or 1B) is exerted on the boat 108, and the initial trailer weight 506 includes the weight of the trailer 104 and the boat 108. Until the vehicle 102 backs far enough down the boat ramp 110, the trailer 104 and the boat 108 have not entered into the body of water 112 and the trailer hitch load 502 remains constant at the initial trailer weight 506.

When the boat 108 enters the body of water 112 at a boat entry point 508, the trailer hitch load 502 begins to decrease below the initial trailer weight 506 as the buoyant force 126 is exerted on the rear of the boat 108. The slope of the trailer hitch load 502 curve varies, although it continues to decrease, between the boat entry point 508 and a rear float point 510. At the rear float point 510, a rear end of the boat 108 is floating in the body of water 112. When the rear end of the boat 108 is floating, the slope of the trailer hitch load curve becomes generally constant. For example, after the rear float point 510, the buoyant force 126 increases generally linearly and, accordingly, the trailer hitch load 502 decreases generally linearly (e.g., because the trailer hitch load 502 is dependent on the buoyant force 126). In some alternative examples, the slope of the trailer hitch load 502 is non-linear as it decreases after the rear float point 510.

The trailer hitch load 502 then reaches a total float point 512, at which the boat 108 is floating on the body of water 112. For example, at the total float point 512 the buoyant force 126 is equal to the weight of the boat 108. When the trailer hitch load 502 reaches the total float point, the vehicle 102 is in the vehicle backup position for launching the boat 108, and the boat can be properly launched from the trailer 104. After the total float point 512, the trailer hitch load 502 remains generally constant at a final trailer weight 514. The final trailer weight 514 is the weight of the trailer 104 when it is submerged in the body of water 112 at the vehicle backup position for launching the boat 108. In some examples, the final trailer weight 514 is substantially the same as the weight of the trailer 104 before the trailer 104 enters the water (e.g., the trailer 104 weighs approximately the same when submerged and when not submerged).

In some examples, the graph 500 is displayed on a vehicle display (e.g., the vehicle display 118 of FIGS. 1A and/or 1B). In some such examples, the graph 500 is displayed in real-time as the vehicle 102 backs down the boat ramp 110 for the driver of the vehicle to interpret. For example, the driver can determine that the total float point 512 has been reached and can therefore stop the vehicle 102 at the vehicle backup position for launching the boat 108. In some examples, the graph 500 only adds data points to the graph 500 when the vehicle 102 is stopped. In such examples, sudden changes in trailer hitch load data, which can obscure the information being displayed, are avoided. Further, because the trailer hitch load 502 is graphed as a function of backup distance 504, the graph will look substantially similar to the graph 500, regardless of whether the driver stops the vehicle 102. For example, when a driver stops the vehicle 102, the backup distance 504 does not change, and the trailer hitch load 502 also remains constant. Accordingly, new data points will not be added to the graph 500 until the vehicle 102 backs further down the boat ramp 110, preventing errors in the graph 500 when the vehicle 102 stops on the boat ramp 110. In some examples, the driver is alerted when the trailer hitch load 502 is at the boat entry point 508, the rear float point 510, and/or the total float point 512. In some such examples, the vehicle display 118 displays instructions to the driver of the vehicle 102 in response to the points 508-512 (e.g., continue backing up the vehicle 102, stop the vehicle 102, etc.).

Further, in some examples, the instruction generator 206 transmits instructions to an engine control module and/or an ABS of the vehicle 102 at different points along the graph 500. For example, the instruction generator 206 can transmit instructions to the engine control module to maintain or increase a throttle position when the trailer hitch load 502 is equal to the initial trailer weight 506. The instruction generator 206 can continue to provide instructions to the engine control module to maintain or increase the throttle while the trailer hitch load 502 is decreasing (e.g., until the trailer hitch load 502 reaches the total float point 512). When the trailer hitch load 502 reaches the total float point 512 (e.g., the trailer hitch load 502 is equal to the final trailer weight 514), the instruction generator 206 can instruct the ABS to apply a braking force to stop the vehicle 102. The vehicle 102 thus stops at the vehicle backup position for launching the boat 108, which is the position of the vehicle 102 when the trailer hitch load 502 reaches the total float point 512.

Figure 6:
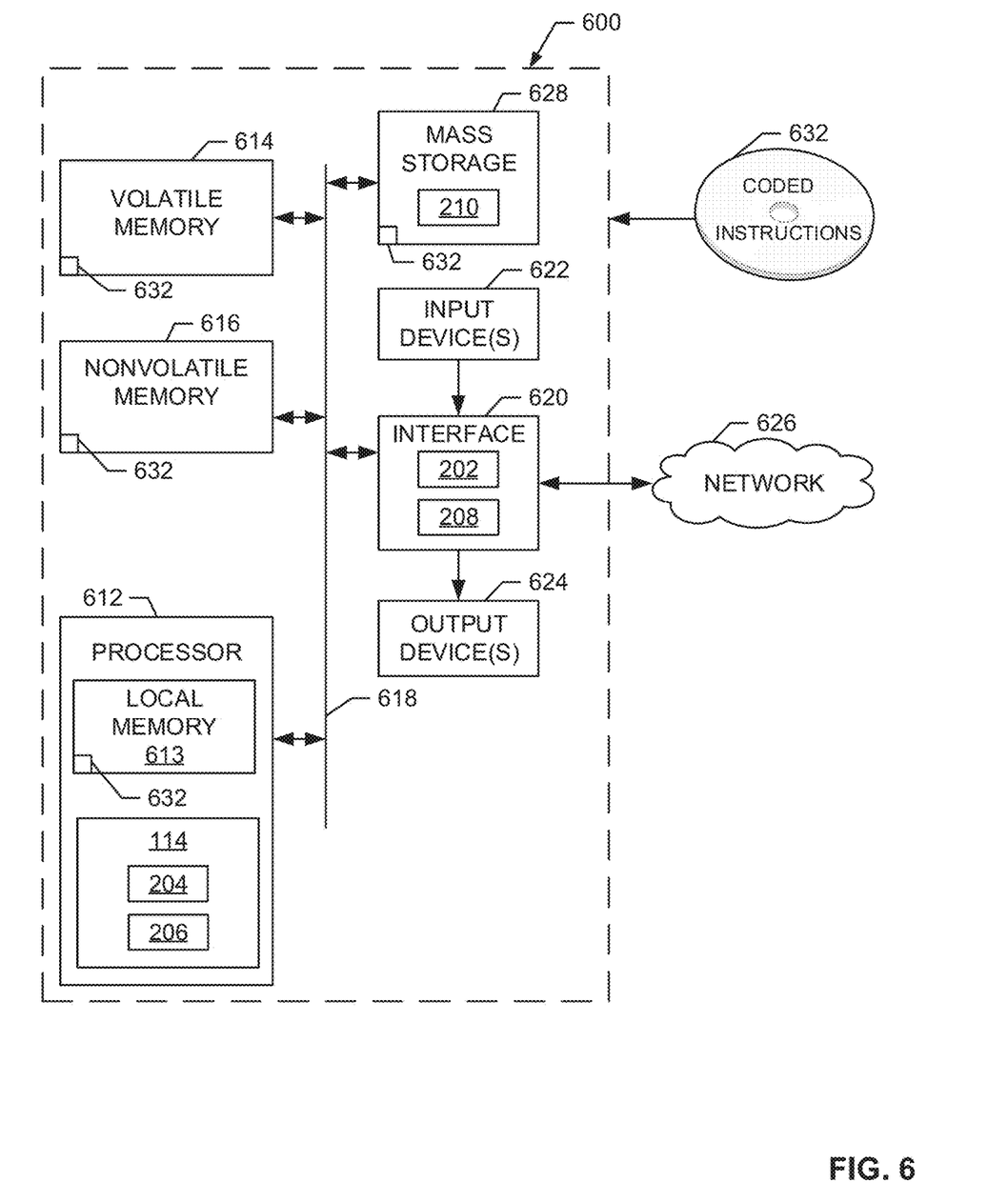
FIG. 6 is a block diagram of an example processing platform structured to execute the instructions of FIGS. 3 and/or 4 to implement the example controller of FIGS. 1A, 1B, and/or 2.

FIG. 6 is a block diagram of an example processor platform 600 structured to execute the instructions of FIGS. 3 and/or 4 to implement the controller 114 of FIGS. 1A, 1B, and/or 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, or any other type of computing device.

The processor platform 600 of the illustrated example includes a processor 612. The processor 612 of the illustrated example is hardware. For example, the processor 612 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example data analyzer 204, the example instruction generator 206, and the controller 114 of FIGS. 1A-2.

The processor 612 of the illustrated example includes a local memory 613 (e.g., a cache). The processor 612 of the illustrated example is in communication with a main memory including a volatile memory 614 and a non-volatile memory 616 via a bus 618. The volatile memory 614 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 616 may be implemented by flash memory and/or any other desired type of memory device. Access to the main memory 614, 616 is controlled by a memory controller.

The processor platform 600 of the illustrated example also includes an interface circuit 620. The interface circuit 620 may be implemented by any type of interface standard, such as an Ethernet interface, a universal serial bus (USB), a Bluetooth® interface, a near field communication (NFC) interface, and/or a PCI express interface. In the illustrated example, the interface circuit 620 implements the example sensor interface 202 and the example display interface 208 of FIG. 2.

In the illustrated example, one or more input devices 622 are connected to the interface circuit 620. The input device(s) 622 permit(s) a user to enter data and/or commands into the processor 612. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 624 are also connected to the interface circuit 620 of the illustrated example. The output devices 624 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, and/or speaker. The interface circuit 620 of the illustrated example, thus, typically includes a graphics driver card, a graphics driver chip and/or a graphics driver processor.

The interface circuit 620 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 626. The communication can be via, for example, an Ethernet connection, a digital subscriber line (DSL) connection, a telephone line connection, a coaxial cable system, a satellite system, a line-of-site wireless system, a cellular telephone system, etc.

The processor platform 600 of the illustrated example also includes one or more mass storage devices 628 for storing software and/or data. Examples of such mass storage devices 628 include floppy disk drives, hard drive disks, compact disk drives, Blu-ray disk drives, redundant array of independent disks (RAID) systems, and digital versatile disk (DVD) drives.

The machine executable instructions 632 of FIGS. 3 and/or 4 may be stored in the mass storage device 628, in the volatile memory 614, in the non-volatile memory 616, and/or on a removable non-transitory computer readable storage medium such as a CD or DVD. In the illustrated example, the mass storage device 628 implements the example database 210 of FIG. 2.

From the foregoing, it will be appreciated that example methods, apparatus and articles of manufacture have been disclosed that determine a vehicle backup position for launching a boat using trailer hitch load. The examples disclosed herein determine a vehicle backup position for launching a boat for a vehicle that enables easy and efficient boat launching and/or prevents damage to the vehicle (e.g., caused by backing too far into a body of water). In some examples disclosed herein, a trailer hitch load is used to determine when the boat is floating on the body of water. In some such examples, the methods and apparatus disclosed herein alert a driver of the vehicle to stop the vehicle. In some alternative examples, the methods and apparatus disclosed herein provide instructions to systems of the vehicle, such as the ABS or an engine control module, to assist in positioning the vehicle in the vehicle backup position for launching a boat. Further, the examples disclosed herein can facilitate loading the boat onto the trailer based on information obtained during the boat launching process.

Example 1 includes an apparatus comprising a data analyzer to determine, based on a trailer hitch load of a vehicle coupled to a trailer, a vehicle backup position for launching a boat at which a boat coupled to the trailer is floating on a body of water and an instruction generator to instruct a braking system of the vehicle to stop the vehicle at the vehicle backup position for launching the boat.

Example 2 includes the apparatus of example 1, wherein the data analyzer determines the vehicle backup position for launching the boat to be a position of the vehicle at which the trailer hitch load of the vehicle is constant.

Example 3 includes the apparatus of example 1, further including a display interface to transmit instructions from the instruction generator to a vehicle display for display to a driver of the vehicle.

Example 4 includes the apparatus of example 3, wherein the display interface transmits instructions to the driver to continue backing up the vehicle when the trailer hitch load is decreasing.

Example 5 includes the apparatus of example 1, wherein the trailer hitch load is measured by determining a change in a magnetic field of a magnetized pin disposed at a trailer hitch.

Example 6 includes the apparatus of example 1, wherein the instruction generator further instructs an engine control module of the vehicle to adjust a throttle position to move the vehicle toward the vehicle backup position for launching the boat.

Example 7 includes the apparatus of example 1, wherein the data analyzer determines the trailer hitch load as a function of backup distance, wherein the backup distance is measured relative to a starting position of the vehicle.

Example 8 includes the apparatus of example 7, wherein the data analyzer further stores the starting position and the vehicle backup position for launching the boat to be used to load the boat onto the trailer.

Example 9 includes a method comprising determining, based on a trailer hitch load of a vehicle coupled to a trailer, a vehicle backup position for launching a boat at which a boat coupled to the trailer is floating on a body of water and instructing a braking system of the vehicle to stop the vehicle at the vehicle backup position for launching the boat.

Example 10 includes the method of example 9, wherein the vehicle backup position for launching the boat is determined to be a position of the vehicle at which the trailer hitch load of the vehicle is constant.

Example 11 includes the method of example 9, further including transmitting instructions from the instruction generator to a vehicle display for display to a driver of the vehicle.

Example 12 includes the method of example 11, wherein instructions are transmitted to the driver to continue backing up the vehicle when the trailer hitch load is decreasing.

Example 13 includes the method of example 9, wherein the trailer hitch load is measured by determining a change in a magnetic field of a magnetized pin disposed at a trailer hitch.

Example 14 includes the method of example 9, further including instructing an engine control module of the vehicle to adjust a throttle position to move the vehicle toward the vehicle backup position for launching the boat.

Example 15 includes the method of example 9, wherein the trailer hitch load is determined as a function of backup distance, wherein the backup distance is measured relative to a starting position of the vehicle.

Example 16 includes the method of example 15, further including storing the starting position and the vehicle backup position for launching the boat to be used to load the boat onto the trailer.

Example 17 includes an apparatus comprising a data analyzer to determine, based on a trailer hitch load of a vehicle coupled to a trailer, a vehicle backup position for launching a boat at which a boat coupled to the trailer is floating on a body of water and an instruction generator to transmit an instruction to stop the vehicle at the vehicle backup position for launching the boat.

Example 18 includes the apparatus of example 17, further including a display interface to transmit instructions from the instruction generator to a vehicle display for display to a driver of the vehicle.

Example 19 includes the apparatus of example 17, wherein the data analyzer determines the trailer hitch load as a function of backup distance, wherein the backup distance is measured relative to a starting position of the vehicle.

Example 20 includes the apparatus of example 19, wherein the data analyzer further stores the starting position and the vehicle backup position for launching the boat to be used to load the boat onto the trailer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

What is claimed is:

1. An apparatus comprising:
   a data analyzer to determine, based on a trailer hitch load of a vehicle coupled to a trailer, a vehicle backup position for launching a boat at which a boat coupled to the trailer is floating on a body of water; and
   an instruction generator to instruct a braking system of the vehicle to stop the vehicle at the vehicle backup position for launching the boat.

2. The apparatus of claim 1, wherein the data analyzer determines the vehicle backup position for launching the boat to be a position of the vehicle at which the trailer hitch load of the vehicle is constant.

3. The apparatus of claim 1, further including a display interface to transmit instructions from the instruction generator to a vehicle display for display to a driver of the vehicle.

4. The apparatus of claim 3, wherein the display interface transmits instructions to the driver to continue backing up the vehicle when the trailer hitch load is decreasing.

5. The apparatus of claim 1, wherein the trailer hitch load is measured by determining a change in a magnetic field of a magnetized pin disposed at a trailer hitch.

6. The apparatus of claim 1, wherein the instruction generator further instructs an engine control module of the vehicle to adjust a throttle position to move the vehicle toward the vehicle backup position for launching the boat.

7. The apparatus of claim 1, wherein the data analyzer determines the trailer hitch load as a function of backup distance, wherein the backup distance is measured relative to a starting position of the vehicle.

8. The apparatus of claim 7, wherein the data analyzer further stores the starting position and the vehicle backup position for launching the boat to be used to load the boat onto the trailer.

9. A method comprising:
   determining, based on a trailer hitch load of a vehicle coupled to a trailer, a vehicle backup position for launching a boat at which a boat coupled to the trailer is floating on a body of water; and
   instructing a braking system of the vehicle to stop the vehicle at the vehicle backup position for launching the boat.

10. The method of claim 9, wherein the vehicle backup position for launching the boat is determined to be a position of the vehicle at which the trailer hitch load of the vehicle is constant.

11. The method of claim 9, further including transmitting instructions to a vehicle display for display to a driver of the vehicle.

12. The method of claim 11, wherein instructions are transmitted to the driver to continue backing up the vehicle when the trailer hitch load is decreasing.

13. The method of claim 9, wherein the trailer hitch load is measured by determining a change in a magnetic field of a magnetized pin disposed at a trailer hitch.

14. The method of claim 9, further including instructing an engine control module of the vehicle to adjust a throttle position to move the vehicle toward the vehicle backup position for launching the boat.

15. The method of claim 9, wherein the trailer hitch load is determined as a function of backup distance, wherein the backup distance is measured relative to a starting position of the vehicle.

16. The method of claim 15, further including storing the starting position and the vehicle backup position for launching the boat to be used to load the boat onto the trailer.

17. An apparatus comprising:
- a data analyzer to determine, based on a trailer hitch load of a vehicle coupled to a trailer, a vehicle backup position for launching a boat at which a boat coupled to the trailer is floating on a body of water; and
- an instruction generator to transmit an instruction to stop the vehicle at the vehicle backup position for launching the boat.

18. The apparatus of claim 17, further including a display interface to transmit instructions from the instruction generator to a vehicle display for display to a driver of the vehicle.

19. The apparatus of claim 17, wherein the data analyzer determines the trailer hitch load as a function of backup distance, wherein the backup distance is measured relative to a starting position of the vehicle.

20. The apparatus of claim 19, wherein the data analyzer further stores the starting position and the vehicle backup position for launching the boat to be used to load the boat onto the trailer.

\* \* \* \* \*